US009047645B2

(12) United States Patent
Postoaca

(10) Patent No.: US 9,047,645 B2
(45) Date of Patent: Jun. 2, 2015

(54) GROUP NETWORK CONNECTOR

(75) Inventor: Andrei Postoaca, Saltsjobaden (SE)

(73) Assignee: Clintelica AB, Stockholm (SE)

( * ) Notice: Subject to any disclaimer, the term of this patent is extended or adjusted under 35 U.S.C. 154(b) by 473 days.

(21) Appl. No.: 13/584,812

(22) Filed: Aug. 13, 2012

(65) Prior Publication Data

US 2013/0097529 A1 Apr. 18, 2013

Related U.S. Application Data

(63) Continuation of application No. 13/275,341, filed on Oct. 18, 2011, now Pat. No. 8,244,851.

(51) Int. Cl.
*G06F 3/00* (2006.01)
*G06Q 50/00* (2012.01)

(52) U.S. Cl.
CPC .................................... *G06Q 50/01* (2013.01)

(58) Field of Classification Search
CPC .................................................. G06Q 50/01
USPC ....................................................... 715/753
See application file for complete search history.

(56) References Cited

U.S. PATENT DOCUMENTS 7,673,327 B1 * 3/2010 Polis et al. ........................ 726/5
7,684,815 B2 * 3/2010 Counts et al. ................ 455/518
7,818,396 B2 * 10/2010 Dolin et al. ................... 709/217
7,908,647 B1 * 3/2011 Polis et al. ........................ 726/5
8,244,851 B1 * 8/2012 Postoaca ....................... 709/223
8,468,168 B2 * 6/2013 Brezina et al. ................ 707/783
8,754,848 B2 * 6/2014 Holzer et al. ................. 345/156
8,924,956 B2 * 12/2014 Smith .......................... 717/176
2005/0091272 A1 * 4/2005 Smith et al. ............... 707/104.1
2005/0182745 A1 * 8/2005 Dhillon et al. .................... 707/1
2007/0168529 A1 * 7/2007 Taylor et al. .................. 709/229
2010/0107088 A1 * 4/2010 Hunt et al. .................... 715/752
2010/0180001 A1 * 7/2010 Hardt ............................ 709/207
2010/0205539 A1 * 8/2010 Gestsson et al. .............. 715/752
2010/0299340 A1 * 11/2010 Murthy et al. ............... 707/759
2011/0010305 A1 * 1/2011 Aleong et al. ................ 705/319
2011/0141974 A1 * 6/2011 Lieberman .................... 370/328
2011/0179161 A1 * 7/2011 Guy et al. ..................... 709/224
2011/0282905 A1 * 11/2011 Polis et al. .................. 707/771
2012/0173526 A1 * 7/2012 Abrams et al. ................ 707/737
2013/0073400 A1 * 3/2013 Heath ........................ 705/14.73

* cited by examiner

*Primary Examiner* — William Titcomb
(74) *Attorney, Agent, or Firm* — Michael D. Eisenberg

(57) ABSTRACT

The present invention relates to a method and system for contacts management and an interface application for managing, searching and sharing electronic contact information of users of a group.

18 Claims, 13 Drawing Sheets

Fig.1.1

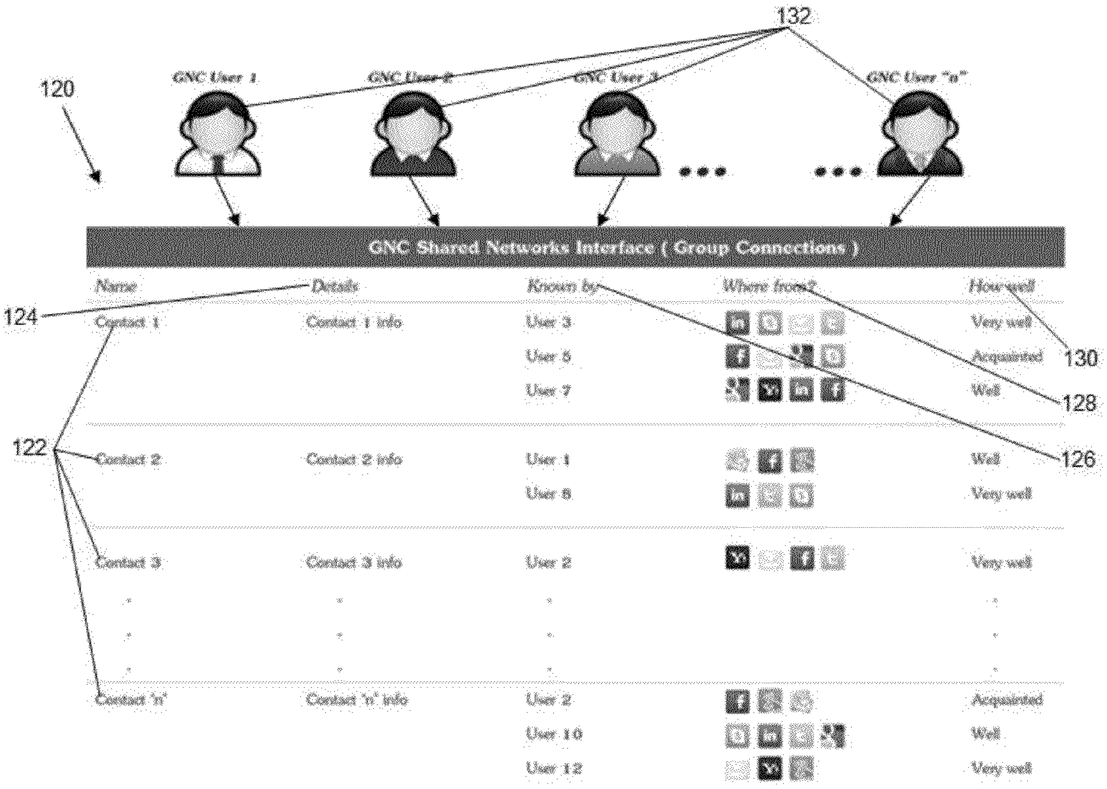
Fig.1.2
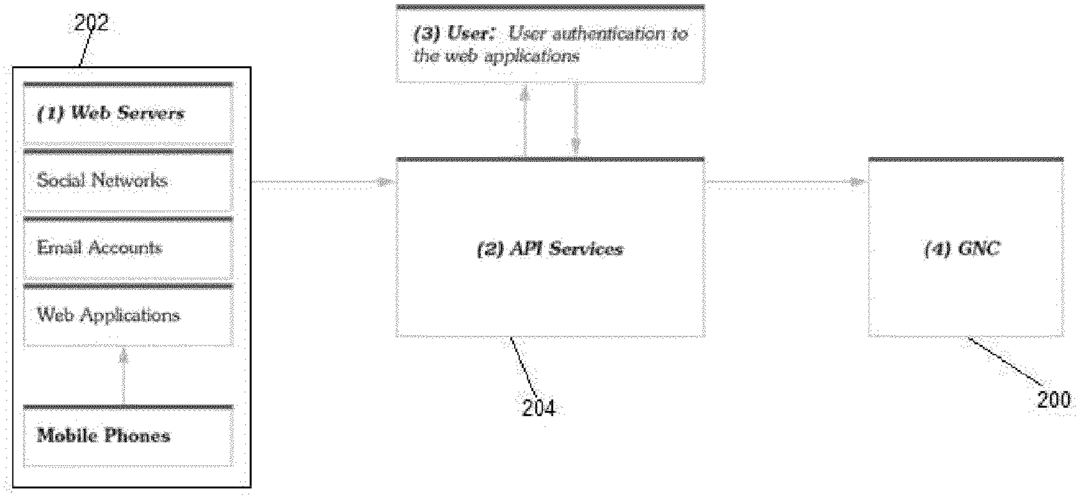
Fig.2

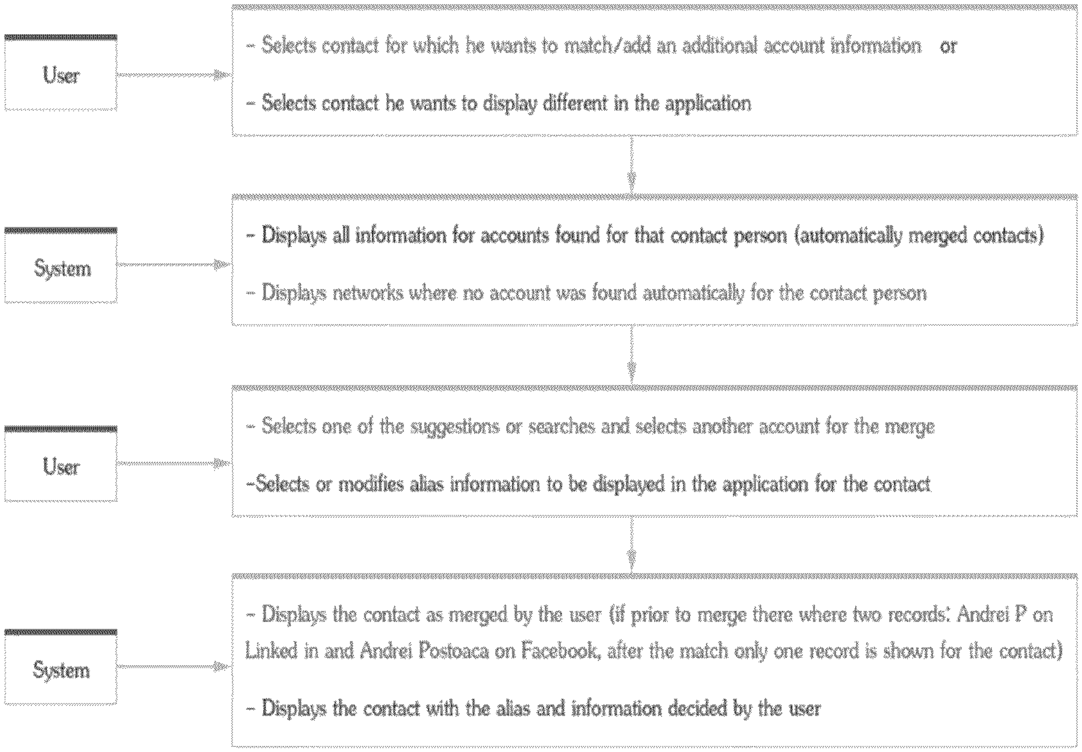
Fig.5.1
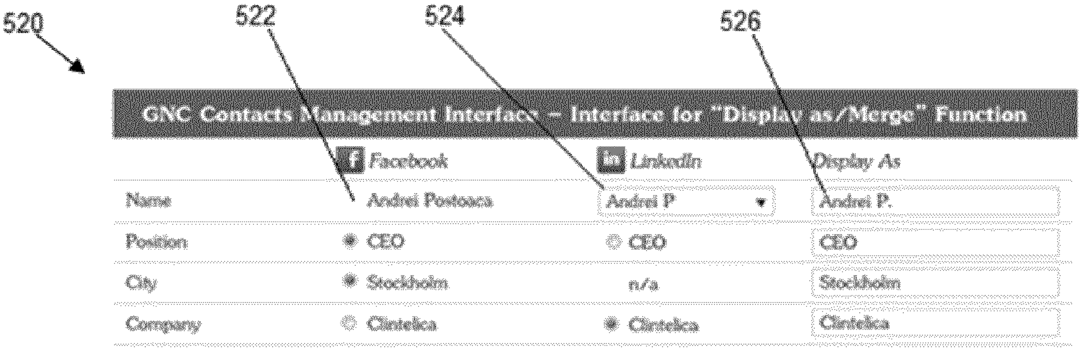
Fig.5.2

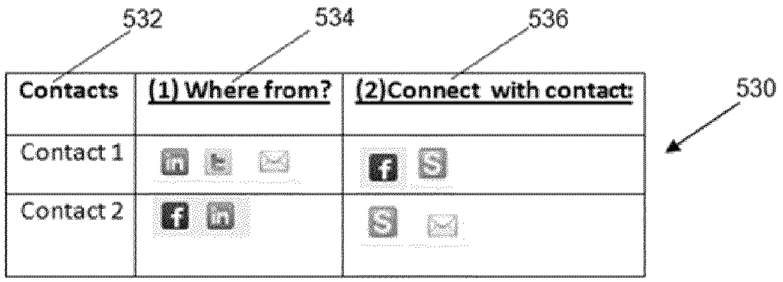
Fig.5.3 (a)
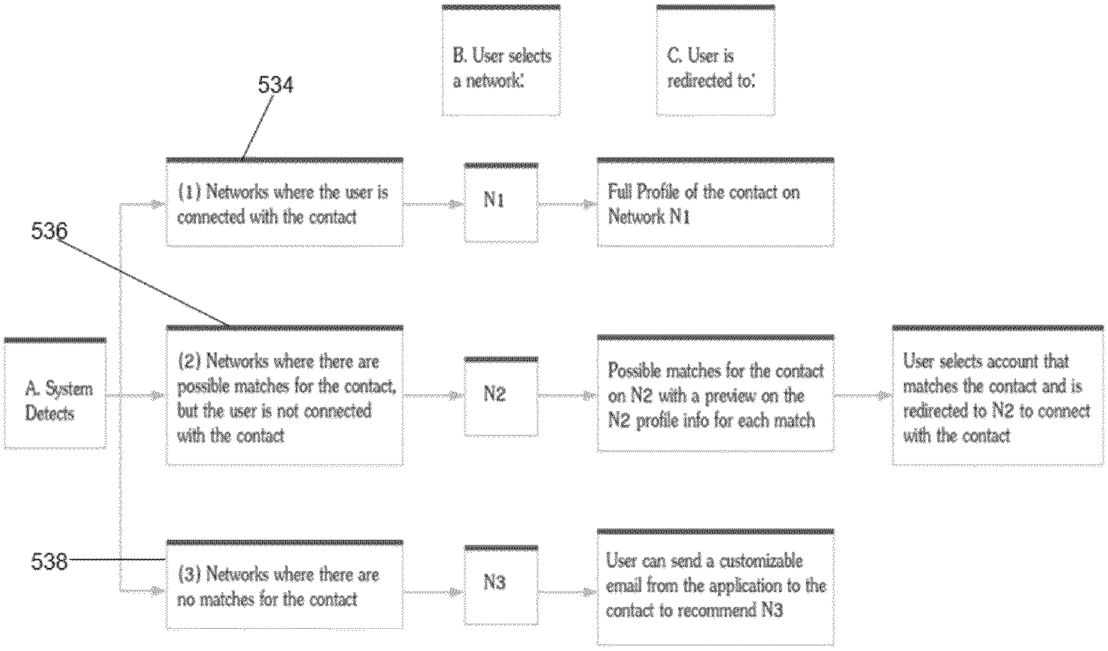
Fig.5.3 (b)

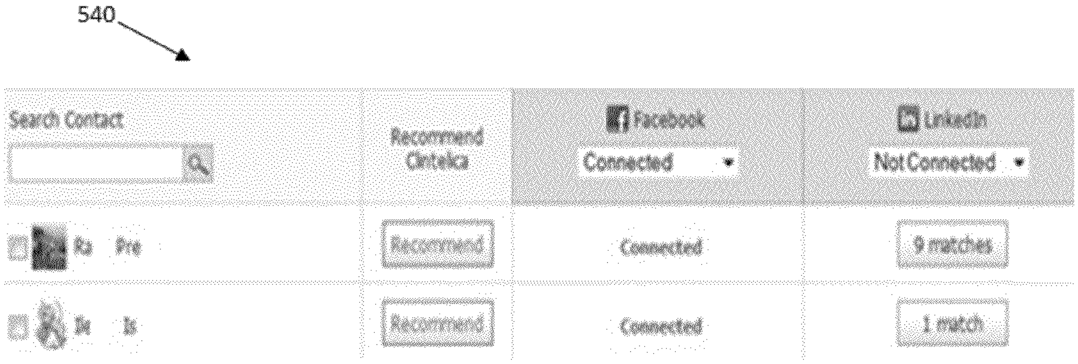
Fig.5.4 (a)
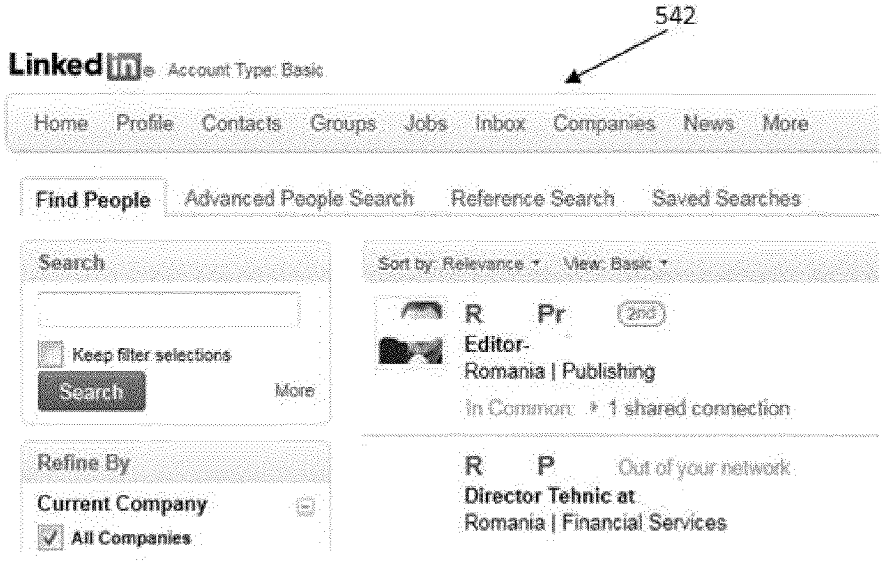
Fig.5.4 (b)

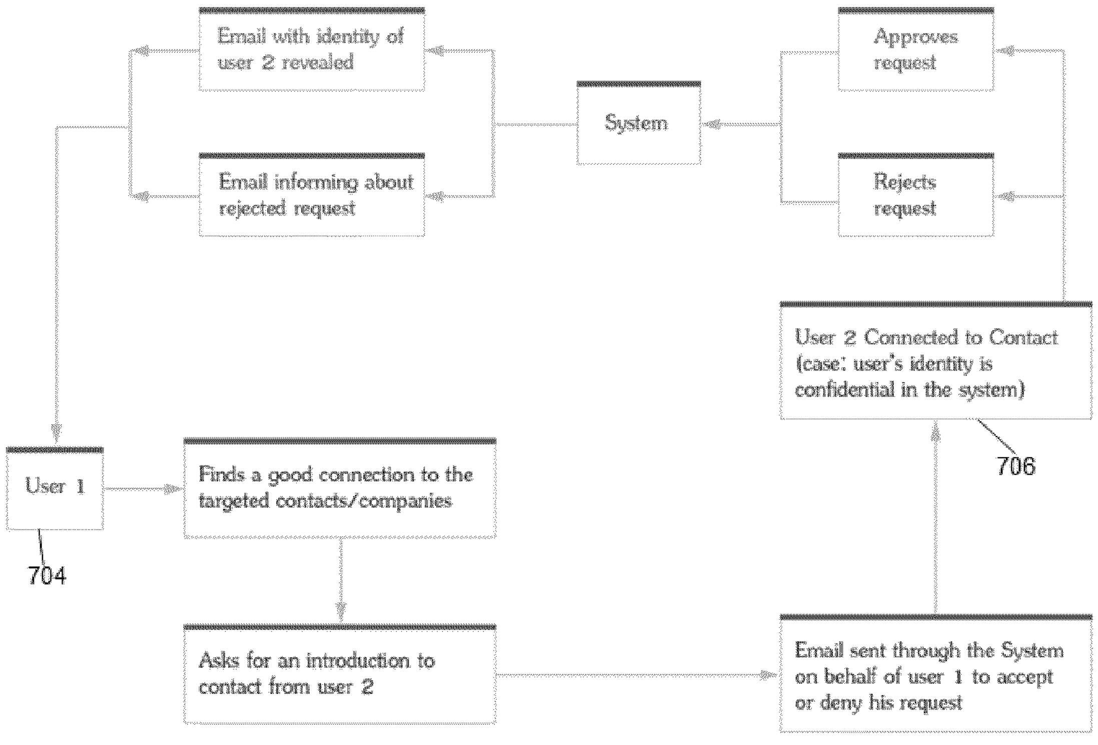
Fig.7.1

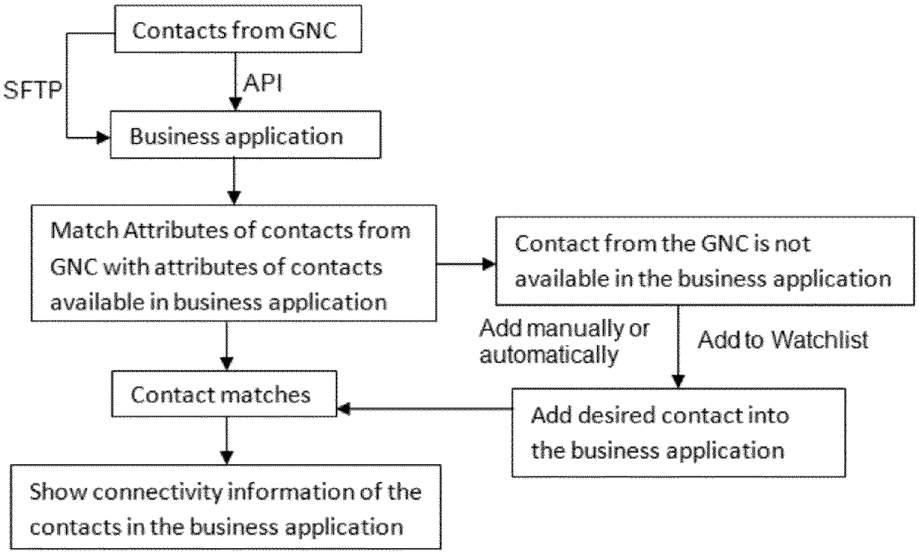
Fig.9
Fig.9.1

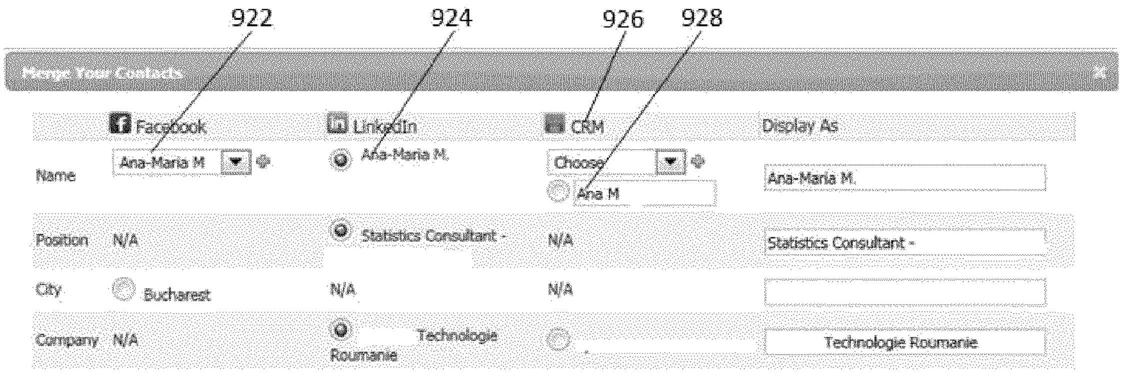
Fig.9.2
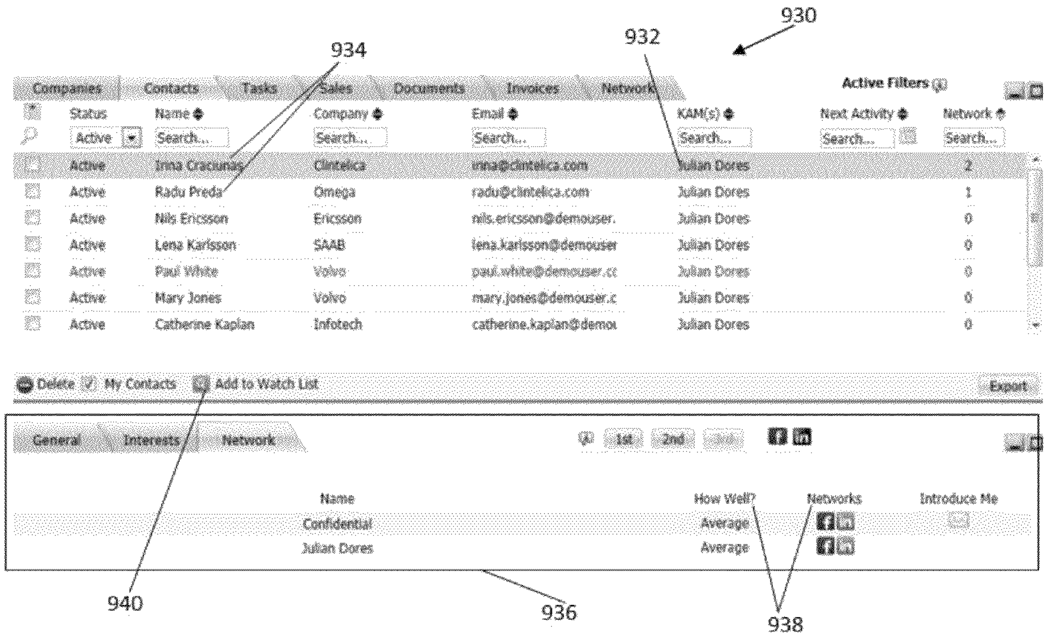
Fig.9.3

GROUP NETWORK CONNECTOR

CROSS-REFERENCES TO RELATED APPLICATIONS

The present application is a continuation of U.S. application Ser. No. 13/275,341 filed on Oct. 18, 2011, now U.S. Pat. No. 8,244,851 which is hereby incorporated herein by reference in its entirety.

TECHNICAL FIELD

The present invention relates to applications for enabling users to access a large pool of contacts in order to make further connections.

BACKGROUND OF THE INVENTION

Conventional social network sites provide an interface for friends and relatives to be in communication, some professional social networking sites such as LinkedIn are frequently used to communicate with peers and business executives. But a personal network is an underutilized asset although it is valuable. However gathering personal connections of individual users in a common pool of contact to create a fast extended pool of contact list which is available to all the users are quite valuable and highly utilized particularly in business development, recruitment purpose and other such related activities.

In today's business environment, sales are done mainly by the sales people and to some extend by the key account managers. Cold calling is still one of the main ways to contact a prospect. Yet, the effectiveness of cold calling is low as the conversion rates of these calls to business meetings do not raise to the desired levels.

A sales person can increase significantly the chances of obtaining a business meeting from the first call if he/she is introduced prior to the targeted contact. An introduction or simply the possibility to refer to a common known person transfers the credibility of that person to the salesperson and facilitates the business discussions with the targeted contact. However, the present system does not provide any solution to effectively use the referral system from the users know to the contact prior to the communication. Especially in large organizations, when meeting a client or prospect it is necessary to know not only what has been discussed with this client before, but which employees have connections with the prospect. This invention gives you an instant view of which person within your organization and your network knows the people you are going to meet or the person that you target to meet. These connections can give you the right introduction, thereby making cold calling redundant.

Also in the present system, experiences sales persons are significantly contributing towards lead generation and thereby growth of the company. However there is a need to develop a system where each and every employee of an organization can significantly contribute to the growth of the company. For example the present system allows a trainee or a junior person in a company to contribute significantly by sharing his/her contacts of interest for the company from his external sources such as Facebook, Linkedin etc. Each employee's contribution to the common pool of contacts of the company substantially increases pool of hot leads for the growth of the company. Also the system of the present invention generates a motivational factor among the employees of the company that they contribute more hands on to the development and growth of their company.

Also there is a need for a tool which integrates with the available business applications of the company so as to improve the contact management more effectively.

The conventional systems also do not provide an interface to get notification about the desired contact when available.

Thus there is a need for a method and system that addresses the above mentioned problems and which is easy to use, less time consuming and provide a single common networking interface for effective contact sharing and contact management among all the users.

BRIEF SUMMARY OF EMBODIMENTS OF THE INVENTION

The present invention relates to a method and system for contacts management and an interface application for managing and sharing electronic contact information of users' of a group. In a variant, the system comprises:

electronic contacts of one user from different external sources to be shared with all the users of the entire group or with selected users of subgroups such as users of a department or specific team of an organization or users of small organizations or daughter companies of a larger conglomerate or the like, wherein the different external sources are social network sources or address book of email accounts and mobile phones or business applications or other contact databases of the user;

an interface configured to download all the electronic contacts shared by the user from the external sources into the contact management interface application, wherein the interface for downloading contacts is configured to download all the electronic contacts of all the users of the application from the external sources and all the downloaded contacts are automatically merged before displayed in the common pull of contacts; an interface configured to merge the downloaded electronic contacts from the different external sources shared by the user in the contact management interface application, wherein the application is configured to display the user's contacts, gathered and merged by the contact management interface application from all the external sources linked to the user;

an interface configured to share a selected set of the merged electronic contacts of the user with all the users or among the selected users of the subgroups and place them into a common pool of shared contacts of other users of the contact management interface application, wherein the sharing interface is configured to permit sharing and displaying the selected set of the merged electronic contacts with other selected users of the group is controlled by the user, and the interface application is configured to provide the user an option to select which contacts from the external sources are shared and displayed into the common pool of contacts, wherein degree of the display of the shared contacts in the interface is controlled by the user, wherein the degree of the display comprises: an option to display a contact's attributes in a search result without displaying who the contact is connected to; another option to display the contact's attributes and the user the contact is linked to and further another option not to display the contact at all in any search;

a searching interface configured to search for specific contacts from the common pool of contacts based on search criteria entered by the user and configured to serve as a management interface to permit users to manage their specific contacts, wherein the searching interface provides the user with the option to conduct keyword based searching of contacts based on their attributes stored in the contact management interface application;

an access interface configured to provide access to all the users of the group to identify and display connectivity information between the electronic contacts and the users to all the users of the group and display the external source from which the electronic contact has been received from, in order to facilitate an introduction or communication between the user and the electronic contact;

an interface configured to add the electronic contacts and their attributes from the common pool of contacts of the contact management interface application into a business application, wherein the contacts to be added can match with contacts stored in the business application and where the information about who knows the electronic contact within the group is highlighted in the business application, wherein the business application includes a customer relationship management (CRM) application of the group and wherein the merging of the electronic contacts from the contact management interface with the contacts from the CRM applications is done automatically or manually by the user; and a watchlist interface to notify the user as soon as a new contact of interest or a new link to a contact established by any user of the contact management interface application is available, wherein the watchlist interface allows the user to add the target contact or target company to the watchlist to receive alerts via email alerts or message alert as soon as new electronic contacts or a new link to a contact established by any user is available among the users of the group of the contact management interface application.

It is an objective of the present invention to provide a better and bigger common contacts management networking interface in an organization so as to boost sales and growth of the organization by using the increased shared contacts in the interface.

It is another objective of the present invention is to provide better common contacts management sharing interface to share personal contacts of every employee to the common interface and contribute to the success of their organization simply by increasing the contacts pool of the organization.

It is another objective of the present invention is to provide an organizational common contacts management referral interface to share an instant view of which person within the organization and in the network knows the person to be contacted so as to provide the right introduction or referral before contacting the desired person and thereby making cold calling redundant.

It is still another objective of the present invention to provide a common contacts management interface for multiple companies to collaborate and complement each other and share their gathered connection base with the common communication interface so as to get mutual benefit from each other via the common communication interface. For an example smaller companies or daughter companies of a larger conglomerate can take the advantage of the common communication interface.

It is still another objective of the present invention is to provide an access to the users to strengthen their network by having an overview of their contacts and their distribution on different platforms and by having the possibility to connect with their contacts on new platforms.

It is still further another objective of the present invention to provide the advantage of the above objectives of the present invention and to assist growth in CRM or ERP application industries, recruitment purpose or job consulting companies, match making or matrimony institutions or any such type of industries.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 1.2 illustrates interface for a group of users for managing their electronic contacts;

FIG. 2 illustrates transfer of contacts from external sources to GNC via API services;

FIG. 5.1 illustrates a flow diagram for the merge interface of the GNC;

FIG. 5.2 illustrates the merge interface of the GNC;

FIG. 5.3 (*a*) illustrates an interface for cross inviting each contact among different networks;

FIG. 5.3 (*b*) illustrates a flow diagram for suggesting other external sources or networks available for connecting with the contact;

FIG. 5.4 (*a*) illustrates an interface to suggest networks where there are possible matches for the contact;

FIG. 5.4 (*b*) illustrates an interface where the user is redirected to the social network site;

FIG. 9 illustrates a flow chart suggesting compatibility of the GNC application to be integrated with business applications;

FIG. 9.1 illustrates an interface for adding contacts automatically into the business application from the GNC;

FIG. 9.2 illustrates an interface for merging electronic contacts in the business application; and FIG. 9.3 illustrates an interface for searching and displaying information about the electronic contacts in the business application.

Figure 1:
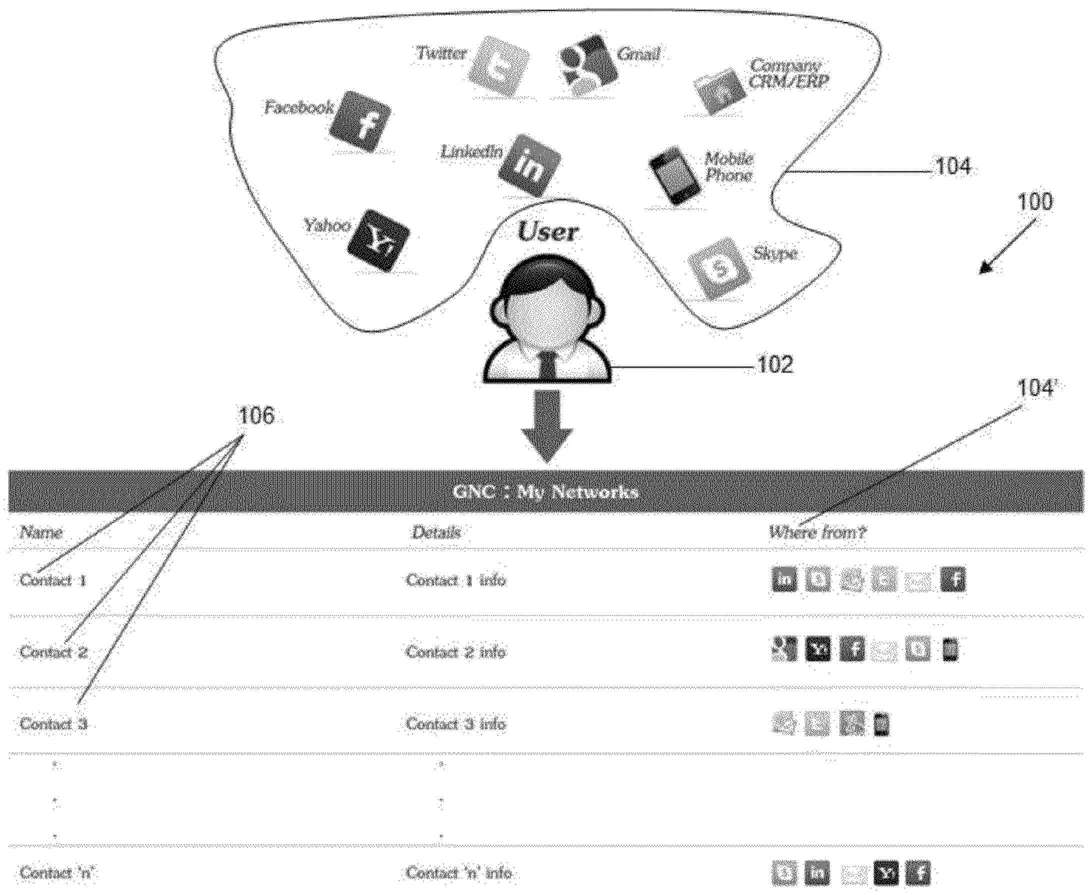
FIG. 1.1 illustrates the interface for a single user for managing his/her electronic contacts.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

A contacts management interface application of the present invention, herein after referred as Group Networking Connector (GNC), acts as a system, a method and a technical solution to be used by a group of persons who share their electronic contacts and connections from different external sources such as social networks, address books of email accounts and mobile phones, applications and other contact databases into a common pool of electronic contacts, thereby facilitating all the users of the group to take benefit from this extended network of contacts available to the entire group, wherein all the users have a preexisting connection between each other within the group.

In an embodiment of the invention, the users as defined in the invention are the persons who use the GNC system to share their contacts or connections from different sources such as but not limited to social network sources or social media websites like Facebook, Twitter, LinkedIn, Skype etc or address books of email accounts and mobile phones or business applications or other contact databases of the user into the GNC system within a group of users and who use the GNC system to retrieve information about the contacts and connections of all users from that group. Each user of the GNC system may be part of a group or multiple subgroups, with which the user shares the user's contacts within the GNC. Further, the users are connected to part of one or multiple subgroups of a group of users within the GNC, which allows the users of the subgroup to perform different operations within the subgroup. The subgroup of a group may be described as users of a department or specific team of an organization or users of small organizations or daughter companies of a larger conglomerate or the like, for example several users can belong to the subgroup "Sales Team" which is a subgroup of a company. Users from the subgroup "Sales Team" can decide to share certain electronic contacts only within the "Sales Team" subgroup and thus those electronic contacts will not be visible to the other users, members of the company.

In an embodiment of the invention as shown in FIG. 1.1, the contact management interface application or the GNC 100, where the user 102 can decide which are the external sources 104 from which the user wants to download electronic contacts 106 into the GNC 100 and where the user can view and manage the user's merged contacts 106 from the different external sources 104' before sharing them in the common pool of contacts of the GNC 100. In an example, the user 102 can decide to selectively share contacts 106 from specific external sources 104' and not from all the sources 104 the user is using. For example, the user can decide to share contacts 106 from the user's email address book, mobile phone, LinkedIn connections into the GNC 100 with the other users, but do not prefer to share the user's connections or contacts from the user's Facebook source.

In another embodiment of the invention, as shown in FIG. 1.2, a Shared Network Interface 120 is provided, where the user has access to all the merged electronic contacts 122, their attributes 124 and the connectivity information (126, 128 and 130) associated with the contacts 122 from all the users 132 of the GNC 120 of the group and the contacts 122 from all the external sources 128 shared by the users 132 within the GNC 120. The GNC system 120 enables a user to share his/her electronic contacts from different external sources 128 within a group and at the same time gain access to the information related to the electronic contacts 124, 126, 128, and 130 shared by all other users 132 from the group of interest he/she is part of, thus creating a common pool of electronic contacts available to the entire group 120 as described in FIG. 1.2.

In another embodiment of the invention, each user has access to the user's GNC account based on a unique username and password and can see besides the user's electronic contacts from different sources also the electronic contacts shared by the other users from the group or groups the user is part of as shown in FIG. 1.2. As described in FIG. 2, the user needs to login to each of the selected external source or web servers 202 and provides acceptance for the application interface of the GNC 200 to read through application programming interface (API) services' 204 specific data from the user's accounts on different external sources 202 and to import contacts and their attributes on the servers of the GNC 200.

Figure 3:
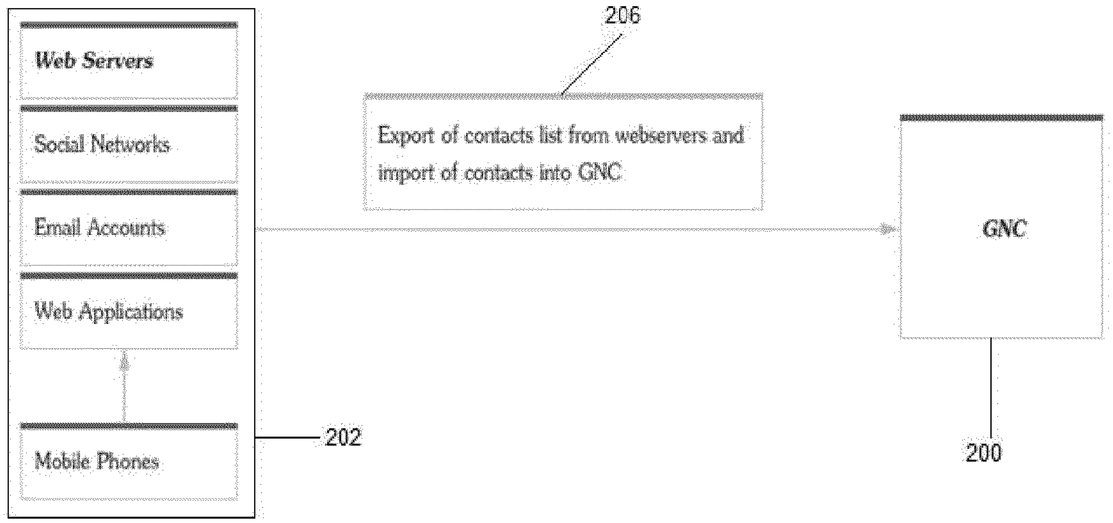
FIG. 3 illustrates transfer of contacts from external sources to the GNC by export and import function.

After the initial automated import of the contacts in the GNC system 200, the GNC system 200 automatically and periodically, updates the information using API services 204 collected from the external sources 202, by importing new information such as new contacts from the external sources 202 into the GNC 200 and by updating existing information or attributes of the contacts in the GNC 200 as and when updated on the external sources 202. For example if a contact of a user has changed the contact's position/company information on any professional network such as LinkedIn 202, the contact will be automatically and periodically updated in the GNC 200. Additional to the usage of API services 204, for external sources 202 for which API services 204 are not available, the user can export 206 the user's contacts from the external source 202 and import them manually by using several file formats such as but not limited to txt, xls or csv files through a dedicated interface in the GNC system 200 as illustrated in FIG. 3.

Figure 4:
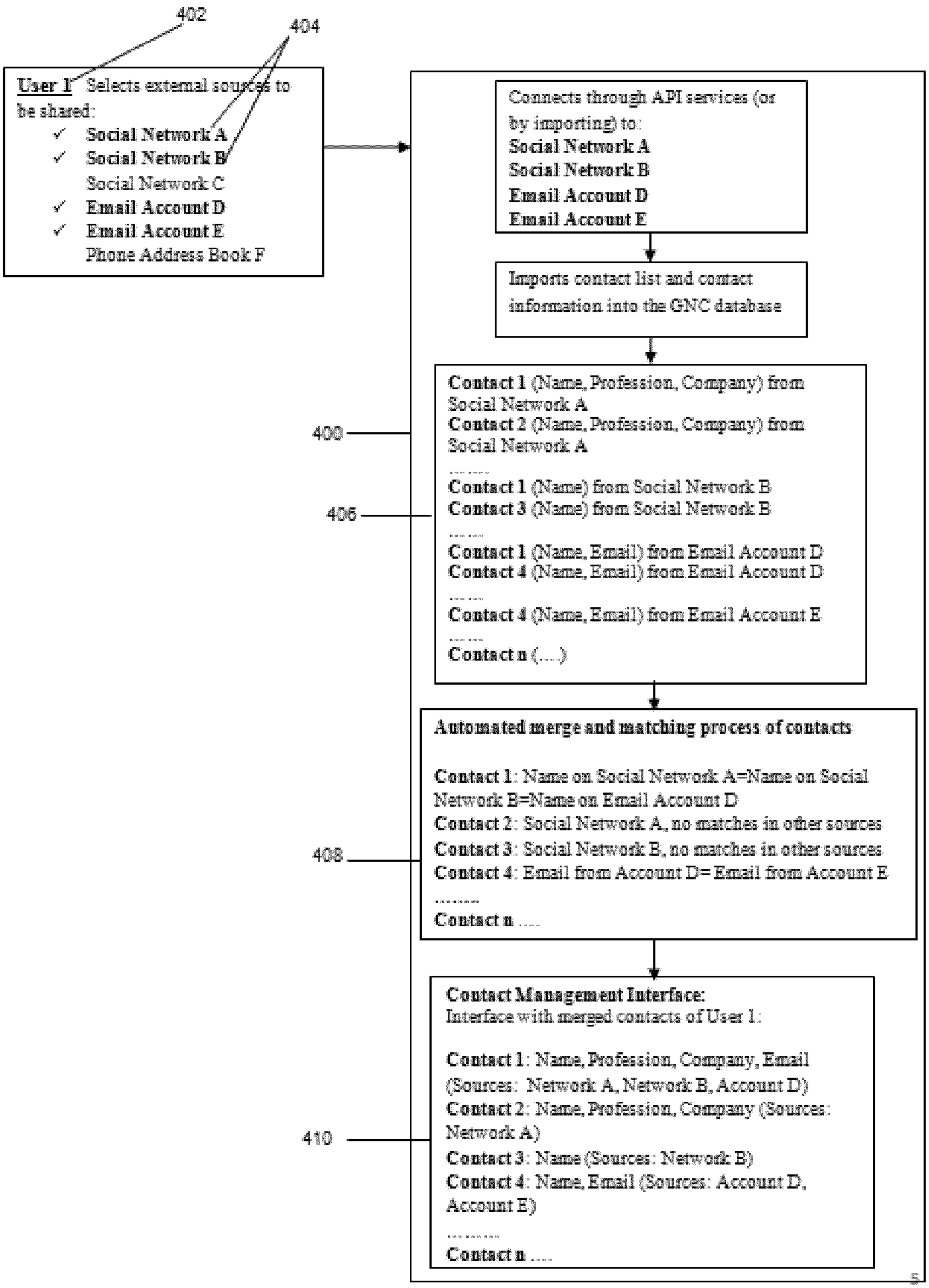
FIG. 4 illustrates a flowchart for importing and matching contact information from external sources into the GNC.

As described in FIG. 4, the contact merging interface of the GNC 400 automatically merges the information from different contact lists of the user 402 available on the different external sources 404 in response to an action by the user to share the selected contacts within the GNC system 400. Based on different matching criteria, GNC 400 finds the contacts which appear on multiple external sources 404. The contacts downloaded or imported 406 from the external sources 404 are matched against each other to remove the duplicates so as to ensure high accuracy of the match and effective merging of contacts as suggested in the automated merge and match step 408.

For example a contact can be matched between LinkedIn and Facebook by name and surname, between email accounts by email only, between professional networks by name, surname and company etc. As a result of the merge of contacts 408 from different sources 404, each contact appears as a unique record in the GNC contact management interface 410 of that specific user 402.

Figure 5:
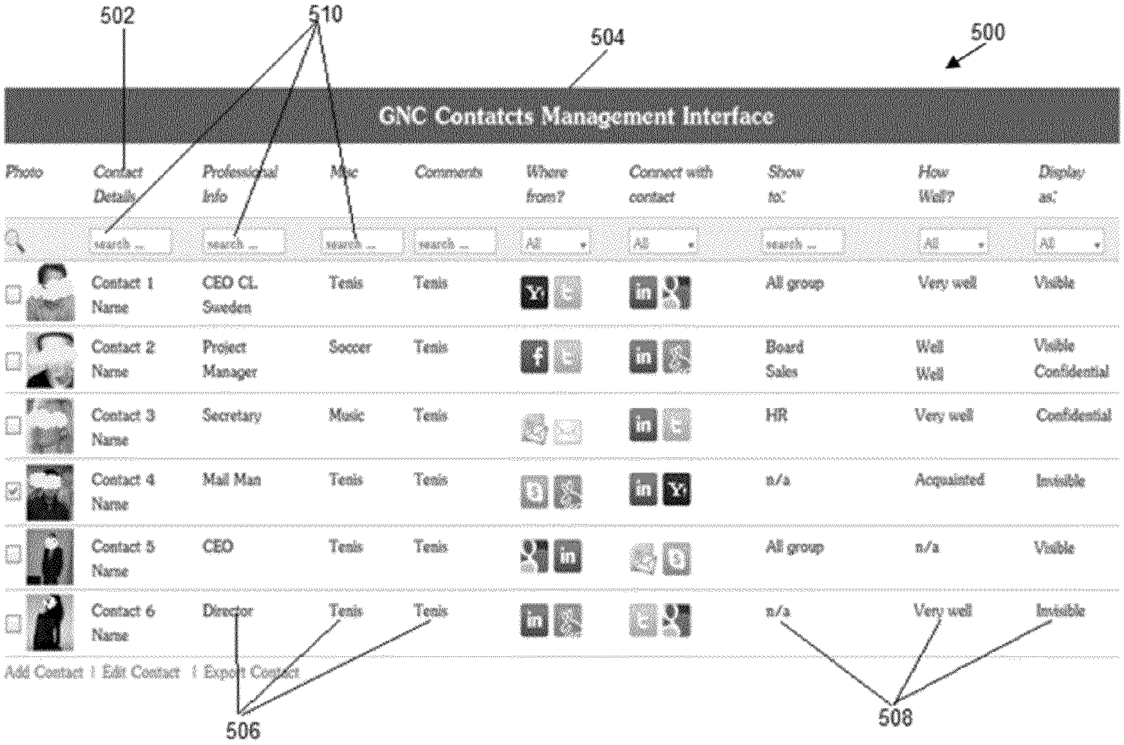
FIG. 5 illustrates the GNC contact management interface.

As shown in FIG. 5, all contacts of a user which are merged and downloaded into the GNC 500, the user can access them in the user's dedicated contact management interface application (GNC) 500. In one interface 500, the user has an overview of all the user's contacts 502 from different external sources 504 and where the user can perform different operations before sharing the contacts into the common pool of contacts of the group.

Further the contact management interface application or the GNC 500 provides additional information to the user for each merged contact in the GNC 500 available to the user. The system 500 displays information with all external sources 504 from which the contact was imported and with all contact attributes 506 such as, but not limited to name, surname, email, phone numbers, company, position, past employers, interests, hobbies, etc. gathered from external sources 504 related to the contact 502. Further, the user can view all contact related information 506 gathered from different external sources 504 and search 510 by different criteria such as but not limited to contact details, professional details or interest, hobbies, etc. The GNC allows the user to modify the information displayed in the interface, for example the user can modify the title/position or company or other attributes of a contact if, for example, the user knows that the information on the different social networks is outdated.

In another embodiment of the invention, connectivity information 508 of the contacts and their attributes 506, such as, but not limited to, any information stored about the electronic contacts on different external sources 504 and shared by the users within the GNC system or information available on different sources available to the user, because of the user's connection with the contact. For example, information may include professional information about a LinkedIn connection like company, job title, company size etc or interests, hobbies, information of a Facebook "friend", or information shared by the user within the GNC system. The user can see which users from the group know a certain contact of interest to the user and from which external source.

In another embodiment of the invention as shown in FIGS. 5.1 and 5.2, the user can also modify the automated match and merge of the contacts done by the GNC, where the merge interface 520 of the GNC displays all the information for the contact searched and found by the user, also the interface 520 displays the networks where no contact was found for the contact searched by the user. The user can select the contact for which the user wants to match additional account information and the user can select contacts that the user wants to display differently in the GNC application interface 520. The user selects and modifies the alias information or the information decided by the user to be displayed in the GNC application interface 520 for that contact. For example, the user might identify that the same contact appears as two different contacts or records in the GNC, as this person uses different names on the user's social networks and as such was not detected by the system as one record or contact. In a dedicated interface, the user can access one of the records and can manually match the contact from a social network with the contact from another social network and thus moving forward, this person will be displayed as one record in the GNC. As displayed in the flow chart of FIG. 5.1 and FIG. 5.2, the GNC displays two records: "Andrei P" 524 on LinkedIn and "Andrei Postoaca" 522 on Facebook prior to the merge of the contacts, but after the match only one record is displayed for the contact and is displayed as decided by the user as "Andrei P." 526 in the GNC.

In another embodiment of the invention as shown in FIG. 5.3 (*a*), the GNC provides an interface 530 to each user allowing the users to cross invite each contact between different networks in order to strengthen the user's own relation with these contacts. As shown in FIG. 5.3 (*b*) the application will detect networks 534 where the user is connected with the contact, networks 536 where there are possible matches for the contact, but the user is not connected with the contact, and networks 538 where there are no matches for the contact. In the case where the application interface 530 detects network 534, the user can view the full profile of the contact on the network 534. If the application interface 530 detects network 536, the user can view the possible matches for the contact on the network 536 with a preview on the profile information for each contact in the network 536, and the user is allowed to select the record that matches with the contact and is redirected to network 536 to connect with the contact. However, if the application interface 530 detects network 538, the user can request the contact via a customized email from the application to recommend the network 538.

For example, the system may detect that user is connected with a contact on Facebook, but not on LinkedIn. Or the application will display persons from the user's mobile phone contacts, who have a social network account. In those cases the system is configured to suggest the user to become a "friend" or otherwise connected with these contacts on the different social networks. Further, the GNC interface 530 allows the user to see for each contact 532, which are the external sources 534 where the user is already connected with the contact and which are the other external sources 536 where the contact has an account, but the user is not connected with the contact. Additionally for the networks where the user is already connected to the contact, from the Network Management Interface, the user can be redirected to the full profile of the contact on the chosen external sources. For example if the user clicks on the Facebook icon next to the contact, the user will be redirected to the profile page of the contact on Facebook as shown in FIG. 5.3 (*b*).

In another exemplary embodiment of the invention, where the user is not connected with the contact of the different networks or external sources, the system automatically detects, based on the attributes of the contact stored in the specific network, which accounts might belong to the contact. The system might detect just one possible match, case in which by clicking on the icon of the network, the user is redirected to the profile of the contact and can invite the contact to become a connection on this network.

If there are multiple account matches 540 suggested by the system for a contact (multiple accounts with the same name), the user is redirected to the social network site 542 showing the search results with all the matches for that name and surname and with the additional profile information (picture, city, company etc), so that the user can choose the correct one and connect with the contact on that social network 542 as illustrated in FIG. 5.4 (*a*) and (*b*).

Figure 6:
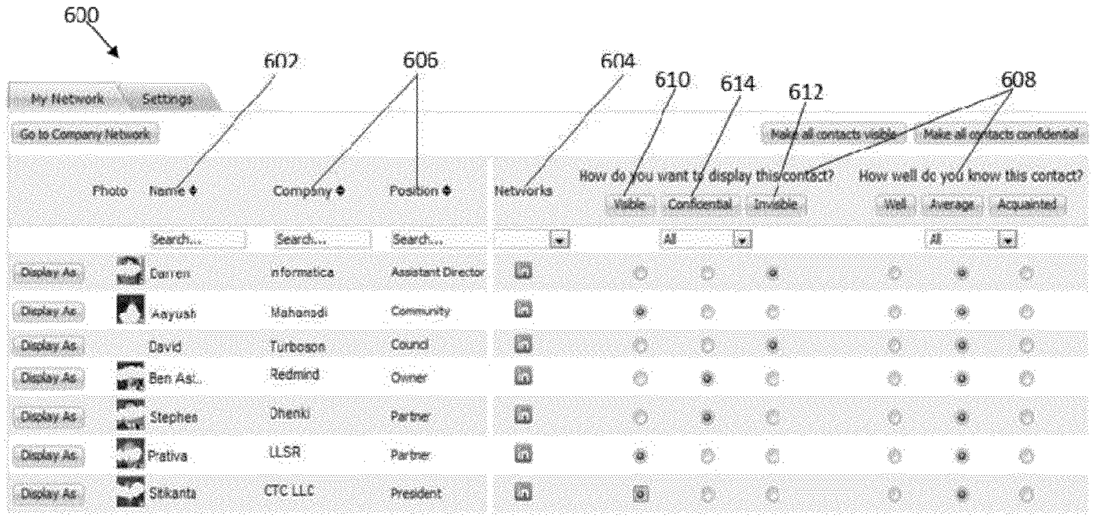
FIG. 6 illustrates an interface sharing contacts within the GNC and degree of display options ("VISIBLE", "INVISIBLE" and "CONFIDENTIAL") available for each contact.

In another embodiment of the invention, as shown in FIG. 6, the interface 600 for sharing contacts 602 within the GNC permits sharing of the selected set of the merged electronic contacts 602 with other selected users of the group. The sharing is controlled by the user, and the interface application 600 is configured to provide the user an option to select which contacts 602 from the external sources 604 are shared with other users from the common pool of contacts of the GNC. Also the interface 600 allows the user to have full control and actively decide the way of sharing (for example, whether to disclose the user's identity, or not, while sharing the contacts with other users is decided by the user) the selected contacts 602 with other users of the user's interest. For an example, the user can decide to share contacts in a differentiated way within the group, such as, there can be some contacts the user wants to share with all group users (for example with all employees in the company who are using the GNC) and other contacts which are to be shared only with certain sub-groups (only with a specific team or subgroup such as the sales and marketing team or between the management board of the company etc).

In another exemplary embodiment of the invention, GNC users belonging to a group, for example belonging to a Company A, which is the company they work in, can see in one interface all the connections of all employees of company A on different social networks, even though not all these employees are necessarily also connected to each other on different social networks and thus they do not all have access to all connections ("friends") of each other on the different social networks they are part of. In the same way, in case of email address books and mobile phone address books or other sources, GNC provides a system through which a user can simultaneously and in an easy way to share contacts from the external sources with the other users who do not have access to the user's email account, mobile phone and other sources.

In another exemplary embodiment of the invention, a user X working in a company A, being part of a networking group B and of a professional association C will be able to share X's electronic contacts among the users of A, B and C provided the users of these groups also use the GNC to share their contacts. In this example, the members of each group will see all the electronic contacts of user X as well as all the electronic contacts shared by the other users from the group. Users belonging to networking group B will see the gathered connections of all members of this networking group, and members of professional association C will see all the gathered connections of all members of this association and same for company A. User X, who belongs to all the three groups and who has shared the X's electronic contacts within all the three groups will see the gathered connections/contacts of all the members/users from all the groups A, B and C. When looking for a person of interest to X, the user X will see that this electronic contact is known, for example by user Y, who is a member of the networking group B, as well as by person Z, who is an employee in the company A.

In another exemplary embodiment of the invention as shown in FIG. 6, the user can control display of contact information 606 about the shared contacts 602 and their connectivity information 608 to the other users of the GNC. Several display options of contact information 606 about the shared contacts 602 and their connectivity information 608 is available with the present GNC system such as "VISIBLE" 610, "INVISIBLE" 612 and "CONFIDENTIAL" 614, however other display options can be configured depending on the need without departing from the scope of the invention. In the "VISIBLE" display option 610, contact 602 is visible to the group and/or subgroups and all the users of the group/subgroup has full access to the information 606 about the contact 602 as well as the connectivity information 608 such as name of the user in the group who is connected to this contact 602 and through which external sources 604 such as Facebook, Linkedin, Gmail, etc. The external sources by which the contact is connected are displayed to all the users of the GNC. In the "INVISIBLE" display option 612, contact 602 is invisible to all the other users of the group/subgroup, such that no information about the contact 602 or the connectivity information 608 is shared with the other users of the GNC application. In the "CONFIDENTIAL" display option 614, connectivity information 608 of the contacts 602 is kept confidential such that other users from the group/subgroup can see the information 606 available about the contact 602 e.g. name, company, title, etc. and they can see that someone in the group knows this contact 602 and from which external sources 604, but they do not see the identity of this user). They can contact the user through the application interface 600 and the user can decide whether the user wants to reveal the user's identity to them or not in order to facilitate a meeting or introduction between the user requesting an introduction and the contact/connection 602 of the user who shared the contact 602 as confidential with the other users. Further the user can also define for each attribute 606 of a contact 602, whether, the user wants to make the attribute visible or not in the GNC. For example the user can decide to share a contact with its name, position, company, source of connection, but not the email and the phone number of the contact 602. The user can also define other connectivity information 608 for each contact 602, such as the degree to which the user is acquainted with the contact, where the user knows the contact from, what kind of relation they have, last date the user met or interacted with the contact, etc as well as other relevant information and additional comments the user wants to share related to the contact.

Figure 7:
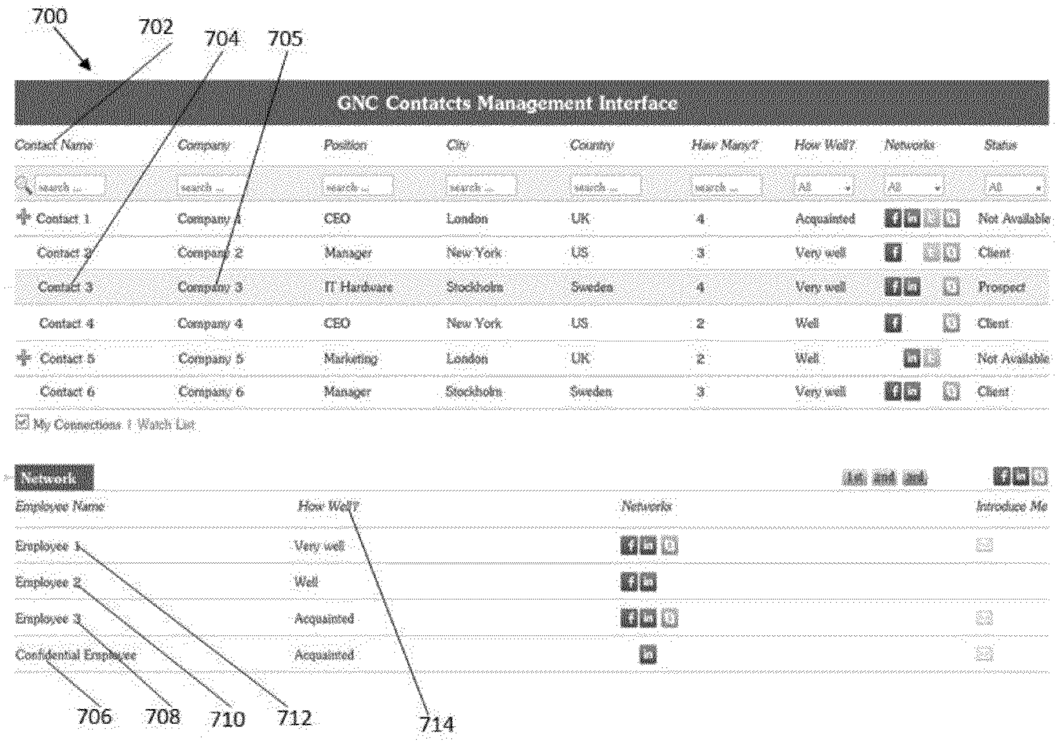
FIG. 7 illustrates a search interface of the GNC application for the common pool of contacts.

In another embodiment of the invention, the search interface 700, as illustrated in FIG. 7, provides shared network or extended group network, to all its users, where all the electronic contacts of all users from a group are available and searchable to all users from the specific group containing information about the contacts 704, their attributes 702 and their connectivity information 714. The user can search for specific persons, companies, by titles, by interest/hobbies and by any other information or attributes 702 available and shared about these contacts in the common pool of contacts of the GNC. The user identifying the desired contact 704 can additionally view the other connectivity information 714 of the contact with other users (706, 708, 710 and 712) of the GNC so as to choose and request the suitable user to facilitate an introduction or referral. For example, for a targeted company 705, the user sees all contacts 704 that work or have worked at the specific company, which users (706, 708, 710 and 712) from the group know the contacts 704 or have themselves worked for the company, how well they know the contacts and other such connectivity information 714. For example, the users can see that user X knows a contact A because user X is connected to the contact on Facebook, while user Y is connected to the same contact on LinkedIn and user Z has the contact A in the user's mobile phone book. Additionally each user can describe for each contact how well he/she knows the contact and add any additional information about the relationship with the contact. Thus a user of the GNC interested in contact A can decide to contact user Z to obtain an introduction or a referral for contact A, because user Z knows the contact A very well, while user X and Y have indicated that they don't know contact A very well.

If a first user finds the desired contact 704 in the GNC and identifies that the desired contact has good connection with a second GNC users, then the first user can request from another user 706, 708, 710 or 712 for an introduction or referral prior to communication with the desired contact so as to facilitate easy and effective communication. The second user 708, 710 or 712 knowing the contact 704, can reject or accept the request. In the case where the user 706 connected to the contact 704 has established that the user's 706 identity is confidential in the GNC (i.e. the user who wants an introduction to the contact 704 sees that another user 706 of the GNC knows the contact, but the user does not see the user's 706 identity/contact details), the two users can still communicate through the system as described in the flow chart of the FIG., 7.1.

Figure 8:
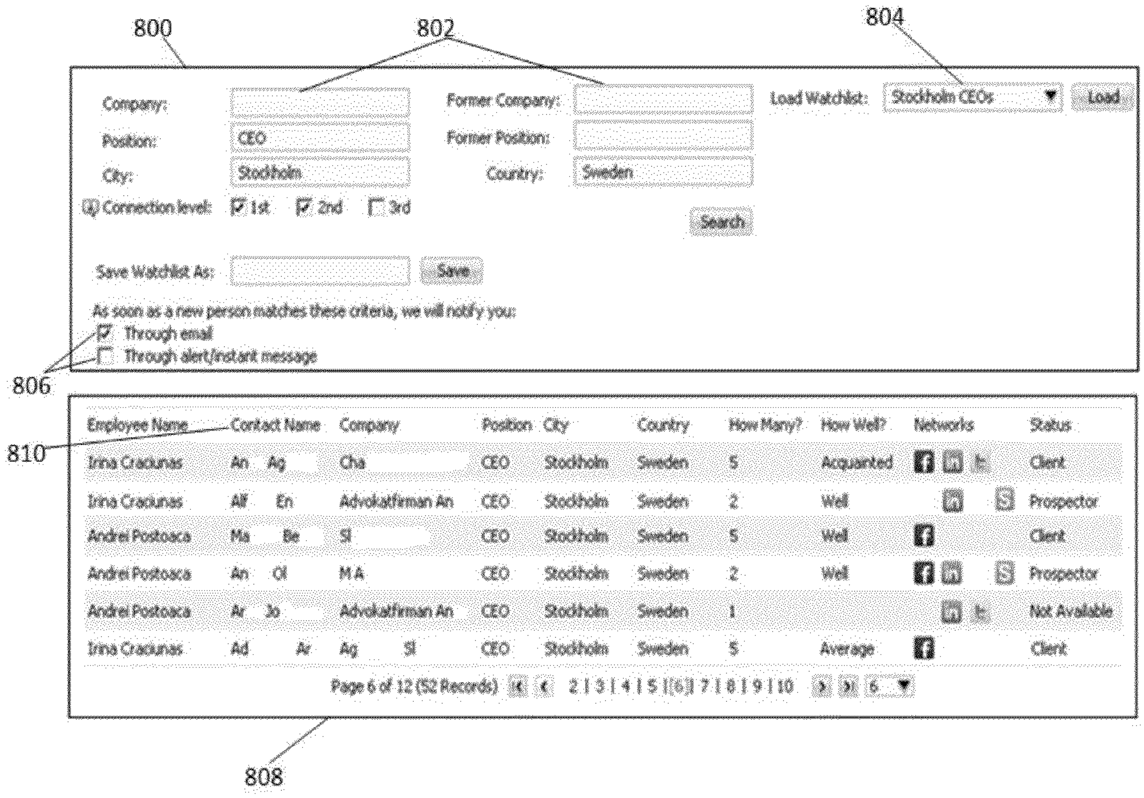
FIG. 8 illustrates an interface for adding unavailable targeted contact/company etc to a watchlist.

In another embodiment of the invention, if the user doesn't find the targeted contact or company in the GNC or does not have a good connection to this contact or the GNC users do not know the contact very well or they reject the request to facilitate an introduction to the contact, then the user can add the targeted contact/company etc to a watchlist 804 as shown in FIG. 8. The user will be alerted or notified as soon as a new contact/company of interest or a new link to a contact established by any user of the contact management interface application is available, wherein the watchlist interface 800 allows the user to add the target contact or target company or desired attributes 802 to the watchlist 804 to receive alerts via email alerts or message alert 806 as soon as new electronic contacts 810 or a new link to a contact established by any user is available (as shown in interface 808 of FIG. 8) among the users of the GNC.

In another embodiment of the invention, as shown in FIG. 9, the flow chart depicts the operability of the GNC application to be integrated with business applications like customer relationship management applications (CRMs) or enterprise resource planning applications (ERPs), etc. At a company level for example, through application programming interface (API) usage or through transfer of information between the business application and the GNC by automatic import and export of contact information through a secure file transfer protocol (sftp) site, or any manual or automatic way of data transfer, between the business application and the GNC, the information from the GNC can be matched and merged with the information from the business application and information can be transferred from one system to another thereby adding the electronic contacts and their attributes from the common pool of contacts of the contact management interface application (GNC) into the business application. The contacts to be added can match with contacts stored in the business application and connectivity information (such as who knows the electronic contact within the group) of the contact may be highlighted in the business application. For the shared contacts in the GNC that do not match with contacts from the business application, the user can search the contact in the GNC application and upon identifying the contact the user can add the contact into the business application either manually or automatically via the interface. If the contact is not available in the GNC application then the user can add the prospect or contact to a watchlist, so that the contact will be added to the business applications as soon as the user gets notification about availability of the contact.

In another embodiment of the invention, as shown in FIG. 9.1, for the shared contacts in the GNC that do not match with contacts from the CRM system, the user sees them in the GNC system, in the common pool of contacts are indicated by an icon 910 (for example, a "+" icon) available left of the contact name, which implies that they are not available in the CRM system and by clicking on the "+" icon 910 the user can add the contacts automatically with all their information as prospects in the CRM. By clicking the "+" icon 910 the user will automatically create a new company, a new contact and a new task in the CRM application and all the information from the GNC (company name, contact name, position, other attributes and the connectivity information) will be visible and searchable in the CRM system.

In another embodiment of the invention, as shown in FIG. 9.2, instead of automatically adding the contacts into the business application as new records (new company, new contact etc), by using the "+ icon", the user can go through an intermediary interface, for manually matching and merging the contacts from the GNC with the contacts from the business application, in case the user suspects that these contacts already exists in the business application, but under a different name. For example, in the interface of the GNC application, where the user sees Ana-Maria M 922 which the user knows from Facebook and Ana-Maria M. 924 Linkedin, but the user has a third column containing the CRM 926 information where the user can search through the contacts stored in the CRM 926 and find that there is already a contact Ana M 928. Thus the user manually matches Ana-Maria M (922 and 924) from the GNC with Ana M 928 contact in the CRM and the system will know and transmit to the CRM that Ana-Maria M (922 and 924) from the GNC and Ana M 928 from the CRM are the same person.

In another exemplary embodiment of the invention, a sales team, using a CRM for managing their prospects or potential clients, clients, etc and the GNC for sharing their contacts from different sources between each other, each member of the sales team will be able to see for all clients and potential clients introduced in the CRM system, which are the ones to which there is a connection available through the other users such as which of their colleagues know the prospects/potential clients and clients and through which external sources. As shown in FIG. 9.3, a CRM 930, where a sales person 932 usually has an interface 936 with all the user's clients, prospects (potential clients the user is targeting) 934, where the user can find the network connectivity information 938 about the client 934. The user 932 can see how many people in the GNC know the prospect 934 from different external sources. If the user clicks on a prospect 934, the user also sees the details about the connectivity information 938 the prospect 934 so that the user can ask for an introduction or referral. The business application interface 930 also provides an option to add specific contacts or companies into the watchlist 940 if there is no connection or no good connection to the specific contact or company through another user. In another example, for searching client or prospected companies in case a sales person is targeting a company, which the user introduced in the CRM system 930 as a prospect, the user will see which of the user's colleagues have a connection to this company and which contact persons they know at the targeted company.

In another exemplary embodiment of the invention, where a first user introduces a contact as a prospect in the CRM system and the contact is displayed as "INVISIBLE" in the network (GNC), but there is a second user of the GNC who has this contact in the user's network, but has not shared it with the first user, the second user of the GNC will be informed by the system that the first user is targeting the contact as a prospect and the second user knowing the contact can decide to contact the first user and let him know that the user is connected to the contact.

In another embodiment of the invention, the GNC interface application can also be used by a group of companies such as smaller companies or daughter companies of a larger conglomerate to have the option to share their connections in order to multiply a lead generation effect. For example, CEO's of different companies can decide to join the connection pools of their companies, in which a user of the GNC system from company A can see that someone in the partner company B knows a contact the user is targeting, but the user cannot see the identity of this user, then the user may ask the user in company B for an introduction to this contact.

While various embodiments of the present invention have been described above, it should be understood that they have been presented by way of example only, and not of limitation Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A contact management interface application for managing and sharing electronic contacts of users of a group, comprising a processor and a computer readable medium having instructions stored thereon, that when executed by the processor cause the processor to generate:

electronic contacts received from one or more sources of a first user shared with all the users of the entire group or with selected users of subgroups within the group wherein all the users of the group have a preexisting connection between each other;

a interface configured display the first user's electronic contacts linked to the first user;

a sharing interface configured to share a selected set of the electronic contacts of the first user with all the users of the group or among the selected users of the subgroups and place the selected set of the electronic contacts of the first user into a common pool of shared contacts of other users of the group;

a searching interface configured to search for specific contacts from the common pool of contacts based on search criteria entered by the first user and configured to serve as a management interface to permit the first user to manage his specific contacts; and an access interface configured to identify and display connectivity information between the electronic contacts and the users, to all the users of the group and display the source from which the electronic contact has been received from, in order to facilitate a communication between a user viewing the access interface and the electronic contact through an introduction from the user connected to the contact.

2. The contact management interface application of claim 1, wherein the one or more sources comprise a social network sources or an address book of email accounts and or mobile phones or business applications or other contact databases of the first user.

3. The contact management interface application of claim 1, wherein the interface is configured to download all the electronic contacts of all the users of the application from external sources and all the downloaded contacts are automatically merged before displayed in the common pool of contacts.

4. The contact management interface application of claim 1, wherein the sharing interface is configured to permit sharing and displaying the selected set of the electronic contacts with other selected users of the group is controlled by the first user, and the interface is configured to provide the first user an option to select which contacts from the external sources are shared and displayed into the common pool of contacts, wherein degree of the display of the shared contacts in the interface is controlled by the user, wherein the degree of the display comprises:

an option to display a contact's attributes in a search result without displaying who the contact is connected to;

an option not to display the contact at all in any search; and an option to display the contact's attributes and the user the contact is linked to.

5. The contact management interface application of claim 1, wherein the searching interface provides the first user with the option to conduct keyword based searching of contacts based on their attributes stored in the interface.

6. A computer implemented method for use in a computer system that executes program steps recorded in a computer readable medium for managing and sharing electronic contact information of users of a group into a contact management interface application available to the entire group, the computer implemented method comprising:

providing a recordable media;

providing a processor for accessing the recordable media; and providing a program of computer-readable instructions embodied on the recordable media executable by the processor of the computer system to perform operations comprising:

sharing electronic contacts of a first user from different external sources with all the users of the entire group or with selected users of subgroups of the entire group;

downloading all the electronic contacts shared by the first user from the external sources into the contact management interface application;

merging the downloaded electronic contacts from the different external sources shared by the first user in the contact management interface application, and displaying to the first user the user's contacts, gathered and merged by the contact management interface application from all the external sources linked to the first user and identifying each externally gathered contact by the external source from which it originated from;

receiving from the first user, a selected set of the merged electronic contacts to be shared into a common pool of contacts of other users of the group of the contact management interface application with all the users of the group or among the selected users of the subgroups;

searching specific contacts in a searching interface from the common pool of contacts and allowing the all users of the group to manage their specific contacts;

providing access to all the users of the group to identify and display connectivity information between the electronic contacts and the users to all the users of the group and display the external source from which the electronic contact has been received from, in order to facilitate a communication between a user viewing the access interface and the electronic contact through an introduction from the user connected to the contact; and integrating the contact management interface application with a business application by adding, merging and sharing the electronic contacts and their attributes from the common pool of contacts of the contact management interface application into the business application, wherein the contacts to be added can match with contacts stored in the business application and the connectivity information of the electronic contact is highlighted in the business application.

7. The method of claim 6, wherein the different external sources are social network sources, address book of email accounts and mobile phones, business applications and other contact databases of all users of the group.

8. The method of claim 6, wherein the step for downloading the electronic contacts is used by all the users of the application to download all the electronic contacts belonging to each other from each others's external sources, wherein all the downloaded contacts are automatically merged before displayed in the common pool of contacts.

9. The method of claim 6, wherein the sharing of the selected set of the merged electronic contacts with other selected users of the group is controlled by the first user, and the interface application is configured to provide the first user an option to choose which contacts from the external sources are shared and displayed into the common pool of contacts, wherein degree of the display of the shared contacts in the interface is controlled by the first user, wherein the degree of the display comprises:

an option to display a contact's attributes in a search result without displaying who the contact is connected to;

an option not to display the contact at all in any search; and an option to display the contact's attributes and the user the contact is linked to.

10. The method of claim 6, wherein the searching interface provides the first user with the option to conduct keyword based searching of contacts based on the contact's attributes stored in the contact management interface application.

11. The method of claim 6, wherein the business application includes a customer relationship management (CRM) application of the group and wherein the merging of the electronic contacts from the contact management interface with the contacts from the CRM applications is done automatically or manually by all users of the group.

12. A computer implemented method for use in a computer system that executes program steps recorded in a computer readable medium for managing and sharing electronic contact information of users of a group into a contact management interface application available to the entire group, the computer implemented method comprising:

providing a recordable media;

providing a processor for accessing the recordable media; and providing a program of computer-readable instructions embodied on the recordable media executable by the processor of the computer system to perform operations comprising:

sharing electronic contacts of a first user from different external sources with all the users of the entire group or with selected users of subgroups;

downloading all the electronic contacts shared by the first user from the external sources into the contact management interface application;

merging the downloaded electronic contacts from the different external sources shared by the first user in the contact management interface application, and displaying to the first user the first user's contacts, gathered and merged by the contact management interface application from all the external sources linked to the first user and identifying each externally gathered contact by the external source from which it originated from;

receiving from the first user, a selected set of the merged electronic contacts to be shared into a common pool of contacts of other users of the contact management interface application with all the users of the group or among the selected users of the subgroups;

searching specific contacts in a searching interface from the common pool of contacts and allowing all the users of the group to manage their specific contacts;

providing access to all the users of the group to identify and display connectivity information between the electronic contacts and the users to all the users of the group and display the external source from which the electronic contact has been received from, in order to facilitate a communication between the user and the electronic contact through an introduction from the user connected to the contact; and integrating the contact management interface application with a business application by adding, merging and sharing the electronic contacts and their attributes from the common pool of contacts of the contact management interface application into the business application, wherein the contacts to be added can match with contacts stored in the business application and the connectivity information of the electronic contact is highlighted in the business application; and creating a watchlist interface to notify the first user as soon as a new contact of interest or a new link to a contact established by any user of the contact management interface application is available.

13. The method of claim 12, wherein the different external sources are social network sources, address book of email accounts and mobile phones, business applications and other contact databases of all users of the group.

14. The method of claim 12, wherein the step for downloading the electronic contacts is used by all the users of the application to download all the electronic contacts belonging to each user from each user's external sources, wherein all the downloaded contacts are automatically merged before displayed in the common pool of contacts.

15. The method of claim 12, wherein the sharing of the selected set of the merged electronic contacts with other selected users of the group is controlled by the first user, and the interface application provides the first user an option to choose which contacts from the external sources are shared and displayed into the common pool of contacts, wherein degree of the display of the shared contacts in the interface is controlled by the first user, wherein the degree of the display comprises:

an option to display a contact's attributes in a search result without displaying who the contact is connected to;

an option not to display the contact at all in any search; and an option to display the contact's attributes and the user the contact is linked to.

16. The method of claim 12, wherein the searching interface provides the first user with the option to conduct keyword based searching of contacts based on the contact's attributes stored in the contact management interface application.

17. The method of claim 12, wherein the business application includes a customer relationship management (CRM) application of the group and wherein the merging of the electronic contacts from the contact management interface with the contacts from the CRM applications is done automatically or manually by all users of the group.

18. The method of claim 12, wherein the watchlist interface allows the first user to add the target contact or target company to the watchlist to receive alerts via email alerts or message alert as soon as new electronic contacts or a new link to a contact established by any user is available among all the users of the group of the contact management interface application.

* * * * *